United States Patent [19]
Eichenhofer

[11] 3,720,123
[45] March 13, 1973

[54] FACING STOP SYSTEM
[75] Inventor: Josef Eichenhofer, Brampton, Ontario, Canada
[73] Assignee: Automatic Bar Feed Ltd., Downsview, Ontario, Canada
[22] Filed: Aug. 13, 1971
[21] Appl. No.: 171,538

[52] U.S. Cl. ........................................ 82/34 A, 82/3
[51] Int. Cl. .......................... B23b 3/36, B23b 3/34
[58] Field of Search ............... 1/21 A, 3; 82/34, 34 A

[56] References Cited

UNITED STATES PATENTS

| | | | |
|---|---|---|---|
| 1,945,663 | 2/1934 | Smith et al. | 82/3 |
| 2,730,229 | 1/1956 | Nichta | 82/34 A X |
| 2,964,982 | 12/1960 | Jobert | 82/34 A X |
| 3,095,771 | 7/1963 | Vann et al. | 82/34 A |
| 3,626,792 | 12/1971 | Eichenhoffer | 82/34 A |

Primary Examiner—Harrison L. Hinson
Attorney—George W. Shaw et al.

[57] ABSTRACT

A facing stop system for a multi-spindle screw machine ejects bar remnants and stops a replenishment bar in position for facing off. It includes a stop member supported for movement axially and transversely of the bar and urged transversely into the path of the bar and toward the spindle. The support for the stop member is secured to the inward facing edge of the cross-slide associated with the feed spindle to be clear of the tool-mounting region of the cross-slide. The stop member is normally closer to the spindle than the end of a faced bar being indexed to the feed station, so that a faced bar moves the stop aside during the feed cycle, and the stop pivots upward to eject a bar remnant fed out of the spindle and to intercept a replenishment bar in proper position for facing off.

16 Claims, 5 Drawing Figures

PATENTED MAR 13 1973 3,720,123

INVENTOR.
JOSEF EICHENHOFER
BY Cumpston, Shaw
and Stephens
ATTORNEYS

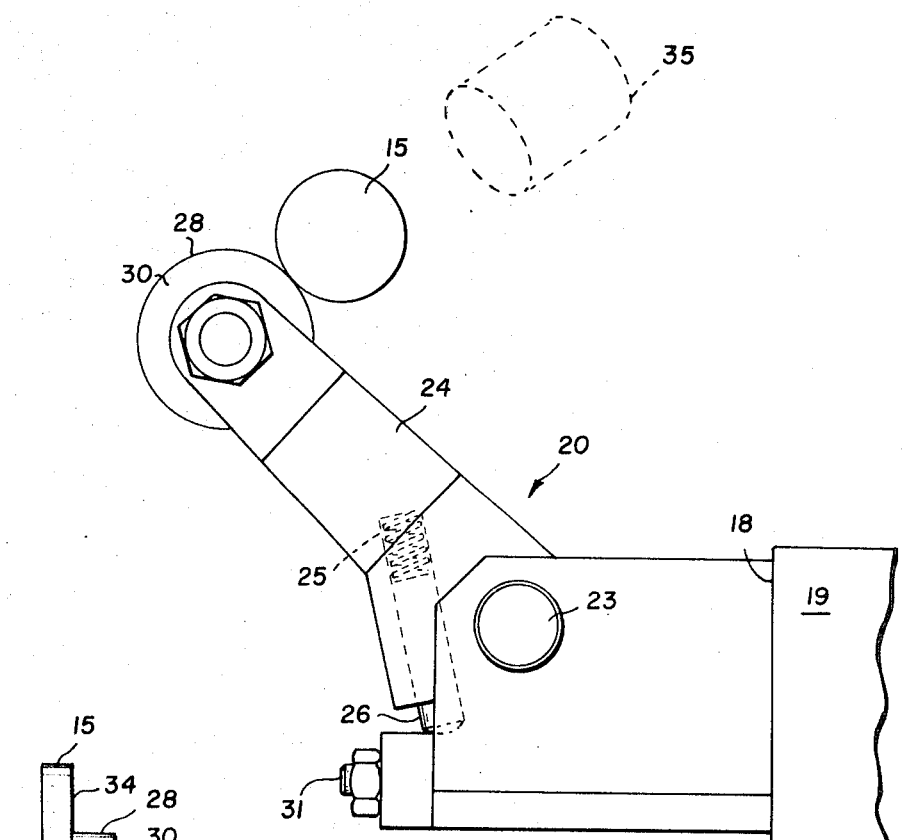
FIG. 4
FIG. 5
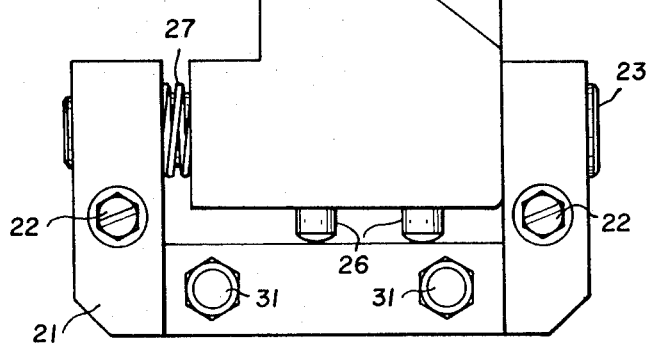
INVENTOR.
JOSEF EICHENHOFER
BY Cumpston, Shaw
and Stephens
ATTORNEYS

FACING STOP SYSTEM

INVENTIVE IMPROVEMENT

Changeover of multiple-spindle screw machines from exhausted bars to replenishment bars formerly required considerable time and skill. Bar remnants were manually ejected, and replenishment bars were manually positioned for facing off. Now that drive roll feeding equipment has been developed for multiple-spindle screw machines, a replenishment bar can be driven through the spindle behind an exhausted bar for an automatic bar changeover, except for problems involving remnant ejection and facing off of the replenishment bar.

The invention recognizes and solves these problems in a facing stop system that ejects bar remnants and intercepts a replenishment bar in a proper position for facing off. The invention aims at simplicity, economy, compatibility with existing equipment, reliability, and long life in performing these operations.

SUMMARY OF THE INVENTION

The inventive facing stop system is applied to multi-spindle screw machines that have a station for feeding a bar forward from a spindle, and a cross-slide associated with the feed station. A stop member is supported for movement both axially and transversely of the bar with the support means secured to the inward facing edge of the cross-slide, clear of the tool-mounting region of the cross-slide. The stop member is urged transversely into the path of the bar and axially toward the spindle, and the stop member is normally closer to the spindle than the end of a faced bar being indexed to the feed station. Hence, a faced bar engages and pushes the stop member aside during the feeding cycle, and a bar remnant that is fed out of the spindle is ejected by the transverse bias of the stop. This also brings the stop into the bar path to intercept a replenishment bar and move axially with the replenishment bar a short distance to a suitable position for facing off the replenishment bar.

DRAWINGS

FIG. 4 is an end elevation of the facing stop of FIG. 2 shown in another operating position; and FIG. 5 is a side elevational view of the facing stop of FIG. 2 shown in another operating position.

DETAILED DESCRIPTION

Figure 1:
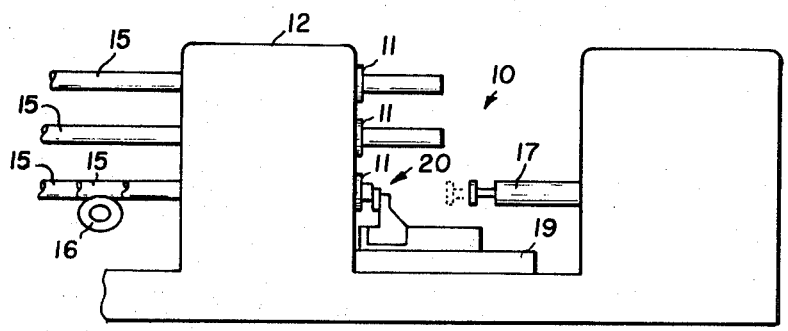
FIG. 1 is a schematic and fragmentary elevational view of a screw machine equipped with the inventive facing stop.

A preferred embodiment of the inventive facing stop is best shown in FIGS. 2 - 5, and FIG. 1 schematically shows a multi-spindle screw machine 10 using the inventive facing stop system with preferred associated equipment. The general system will be explained first, and then the particulars of a preferred embodiment of the inventive facing stop will be explained.

Screw machine 10 is a generally known, multi-spindle screw machine having a plurality of spindles 11 a few of which are shown in headstock 12. Such machines have a feed station at which a bar 15 is fed through its spindle 11 to advance the bar for forming another workpiece. The feeding station sequentially follows the cutoff station where a preceding workpiece was removed from bar 15. The cutting off of a preceding workpiece also faces off bar 15 for forming a succeeding workpiece, but a replenishment bar from which no workpiece has been cut must have its leading end faced off by the machine's cutoff tool to ensure that the bar is in suitable condition for forming a workpiece and does not have any deformities that would damage the machine. Also, after so many workpieces are cut successively from bar 15 that it is nearly consumed, then its remnant end must be ejected or discarded.

These bar changing operations previously required considerable time while an operator manually thrust replenishment bars through headstock 12 to force each remnant out of the machine and then manually positioned the replenishment bar for facing off. This wasted both materials and time and added to the expense of operation of spindle screw machines.

Machine 10 preferably has improved bar-feeding equipment including a drive roll feeder 16 and a push back stop 17. Drive roll feeder 16 advances a bar 15 by engaging the bar with a driven roller that forces the bar through spindle 11 into engagement with push back stop 17 which stops bar 15 in an over-feed position and then pushes it back to the desired workpiece length as represented by the broken-line position of stop 17 in FIG. 1. These components enable automatic bar replenishment if remnant ejection and facing off can be accomplished. The inventive system performs both these functions and cooperates with drive roll feeder 16 and push back stop 17 to afford automatic bar replenishment for machine 10.

Facing stop 20 is secured to cross-slide 19 that is normally associated with a spindle 11 at the feed station of machine 10. Tools are normally mounted on the upper surface of cross-slide 19 for cutting and machining workpieces, and facing stop 20 is clear of the tool-mounting region of cross-slide 19 and is secured to the inward facing edge 18 of cross-slide 19. In such position, facing stop 20 is moved away from bar 15 during the working cycle of machine 10 when cross-slide 19 moves relatively inward as shown by the arrows. During the stock indexing and feeding cycle of machine 10, cross-slide 19 retracts to the position of FIG. 3 to bring facing stop 20 to the region of spindle 11 at the feeding station of machine 10.

Referring to FIGS. 2 - 5, facing stop 20 includes a base 21 fastened to the inner edge 18 of cross-slide 19 by screws 22. Base 21 carries shaft 23 supporting an arm 24 that pivots vertically in a plane perpendicular to the axis of bar 15. Springs 25 urge pins 26 against base 21 to bias arm 24 vertically upward and transversely into the path of bar 15. Arm 24 also moves axially of bar 15 along shaft 23 and is biased toward spindle 11 by a tension spring 27.

A roller 30, serving as a stop member, is rotatably mounted at the upper end of arm 24 on the spindle side of arm 24. Roller 30 has a radial face 29 confronting spindle 11, and a peripheral surface 28 for engaging bar 15. Radial face 29 is preferably flat, and peripheral surface 28 is preferably cylindrical.

Screws 31 extend through a portion of base 21 and have stud ends 32 that engage a lever end 33 of arm 24 for adjustably limiting the upward pivotal travel of arm 24. Facing stop 20 is preferably ruggedly built for a long life, and roller 30 is preferably smoothly finished so as not to mar bars 15.

Figure 3:
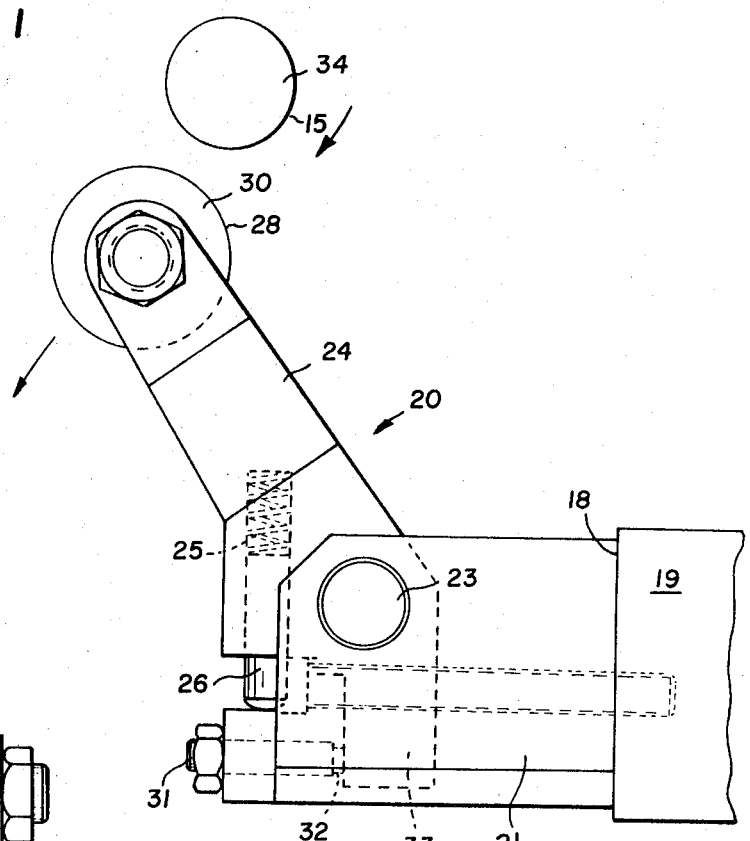
FIG. 3 is an end elevation of the facing stop of FIG. 2 shown in one operating position.
Figure 2:
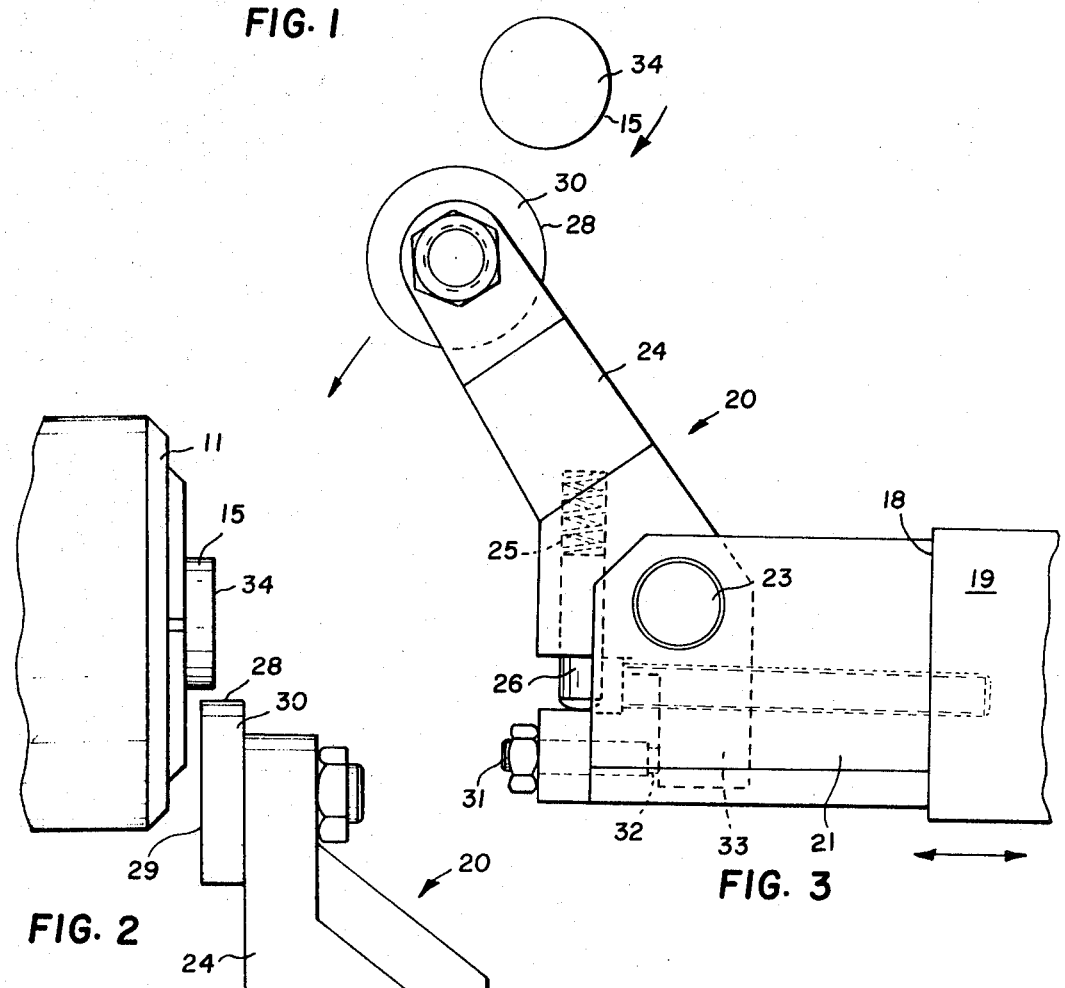
FIG. 2 is a side elevational view of a preferred embodiment of the inventive facing stop.

In operation, a faced bar 15 that has passed by the machine's cutoff tool has a faced end 34 that extends outward from spindle 11 as shown in FIG. 2. Roller 30 is normally closer to spindle 11 than faced end 34, as illustrated, because of the bias maintained by spring 27. Hence, as faced bar 15 is indexed into the feeding station of machine 10 to approach stop 20 as illustrated in FIGS. 2 and 3, faced bar 15 extends at least part way over roller 30 to engage roller 30 and move roller 30 and arm 24 counterclockwise out of the path of bar 15 to the position shown in FIG. 4. Faced bar 15 is then fed past stop 20 by drive roll feeder 16 into engagement with push-back stop 17 which then pushes bar 15 back to the desired workpiece length.

If bar 15 is long enough to permit such overfeeding, it will be positioned successfully for forming a new workpiece, and cycling of the machine will continue normally. When the remnant end of bar 15 is finally reduced to a length too short for such overfeeding, the trailing end of the remnant will be forced out of spindle 11 by a replenishment bar being driven behind the remnant by drive roll feeder 16. When this happens, arm 24 pivots clockwise upward under the bias of springs 25 to eject or flip the remnant 35 clear of the machine, as shown in broken lines in FIG. 4. This also moves the face 29 of roller 30 into the path of bar 15 to intercept the replenishment bar which engages surface 29.

The replenishment bar 15 is not yet faced off, but it is driven against roller 30 by drive roll feeder 16 with sufficient force to overcome the bias of spring 27 and move arm 24 axially of bar 15 to the right on shaft 23 to the position shown in FIG. 5. This allows the leading end of the replenishment bar to extend outward from spindle 11 a little beyond the faced end 34 of a faced bar 15. The replenishment bar then indexes through the stations of machine 10 until it reaches the cutoff tool which faces off its leading end 34 to form a faced bar as illustrated in FIG. 2. On the next indexing step of the machine, this faced bar engages roller 30 and moves roller 30 and arm 24 aside as previously described so that the faced bar can be fed against push-back stop 17 by drive roll feeder 16. The faced bar is pushed back by stop 17 to correct workpiece length and continues cycling through the machine until it is consumed. The initial indexing of the replenishment bar beyond the feed station after completion of the feed cycle allows arm 24 to move back toward spindle 11 under the bias of spring 27 to resume the position illustrated in FIG. 2 for engaging a succeeding bar as it advances into the feed station.

Hence, it can be seen that the relatively simple facing stop 20 accomplishes remnant ejection and facing off of a replenishment bar, without using space reserved for other equipment, and without interfering with other operations of machine 10. Facing stop 20 is also readily adapted to many existing machines with very little modification thereof. The inventive facing stop system is especially useful in combination with drive-roll feeder 16 and push-back stop 17 as described, and in conjunction with these devices it affords a completely automatic bar replenishment system hitherto unavailable in multi-spindle screw machines.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the various spring, lever and motion arrangements available to practice the invention, and will know how to adapt the inventive device to various machines.

I claim:

1. In a multi-spindle screw machine having a station for feeding a bar forward from a spindle and having a cross-slide associated with said feed station, a facing stop system comprising:
   a. a stop member;
   b. means supporting said stop member for movement both axially and transversely of said bar;
   c. means for urging said stop member transversely into the path of said bar;
   d. means for urging said stop member toward said spindle;
   e. said support means being secured to said machine clear of the tool mounting region thereof; and
   f. said stop member normally being closer to said spindle than the end of a faced bar being indexed to said feed station.

2. The facing stop system of claim 1 wherein said stop member comprises a roller having a radial face confronting said spindle and a peripheral surface for engaging said faced bar.

3. The facing stop system of claim 1 wherein said support means includes an arm mounted for vertical pivotal motion in a plane perpendicular to the axis of said bar.

4. The facing stop system of claim 3 wherein said support arm is mounted for motion axially of said bar.

5. The facing stop system of claim 3 including means for adjustably limiting the upward pivotal motion of said arm.

6. The facing stop system of claim 3 wherein said stop member comprises a roller mounted on said arm and having a radial face confronting said spindle and a peripheral surface for engaging said faced bar.

7. The facing stop system of claim 6 including means for limiting said vertical and axial motions of said arm.

8. The facing stop system of claim 1 wherein said support means is secured to the inward facing edge of said cross-slide.

9. The facing stop system of claim 8 wherein said cross-slide is arranged to move said stop member away from said bar after the feed cycle of said machine.

10. The facing stop system of claim 1 including a drive roller bar feeder arranged for driving a replenishment bar through said spindle behind said faced bar.

11. The facing stop system of claim 1 including a push-back stop arranged on said machine.

12. The facing stop system of claim 11 including a drive roller bar feeder arranged for driving a replenishment bar through said spindle behind said faced bar.

13. The facing stop system of claim 12 wherein said support means includes an arm mounted for vertical pivotal motion in a plane perpendicular to the axis of said bar.

14. The facing stop system of claim 13 wherein said stop member comprises a roller mounted on said arm and having a radial face confronting said spindle and a peripheral surface for engaging said faced bar.

15. The facing stop system of claim 14 wherein said support means is secured to the inward facing edge of said cross-slide and said cross-slide is arranged to move said stop member away from said bar after the feed cycle of said machine.

16. The facing stop system of claim 15 including means for limiting said vertical and axial motions of said arm.

* * * * *